Figure 1:
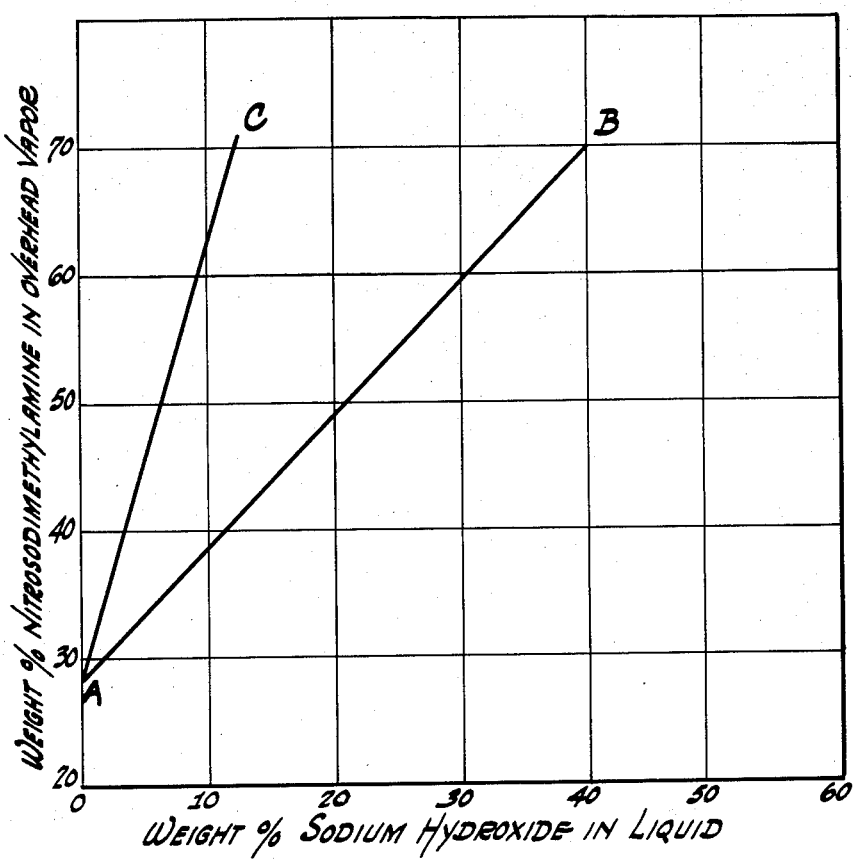

INVENTORS:
LOUIS H. DIAMOND
WILLIAM B. TUEMMLER &
JOHN W. GETZ

United States Patent Office 3,164,535
Patented Jan. 5, 1965

3,164,535
RECOVERY OF HIGH PURITY NITROSODIMETHYLAMINE BY DISTILLATION AND PHASE SEPARATION BOTH WITH CAUSTIC
Louis H. Diamond, Yardley, Pa., and William B. Tuemmler, Catonsville, and John W. Getz, Baltimore, Md., assignors to FMC Corporation, a corporation of Delaware
Filed Jan. 16, 1961, Ser. No. 82,983
4 Claims. (Cl. 202—57)

This invention relates to the treatment of nitrosodimethylamine, and more particularly to an improved method for the purification and concentration of nitrosodimethylamine to provide a material useful in the manufacture of unsymmetrical dimethylhydrazine.

Nitrosodimethylamine, hereinafter NDMA, is an intermediate in the production of unsymmetrical dimethylhydrazine, hereinafter referred to as UDMH, which is useful as a rocket fuel and the like. The conversion of NDMA to UDMH has been conducted classically by reduction with nascent hydrogen, as from a combination of acetic acid and zinc. When the need developed for large quantities of UDMH, standard reduction techniques with hydrogen, in the presence of a noble metal catalyst, were adopted. A particularly effective catalyst is the combination of palladium and iron disclosed in U.S. patent application Serial No. 676,504, filed August 6, 1957 now Patent No. 2,979,505, assigned to the present assignee.

The NDMA employed in producing UDMH may be produced by reaction of dimethylamine, sodium nitrite and acid, or by reaction of dimethylamine with nitrogen oxides. In the first case, sodium nitrite is added to a neutral or slightly alkaline solution of dimethylamine, and acid is added to initiate reaction. In the case of the nitrogen oxides reaction, the oxides are added to the dimethylamine in the vapor phase under acid conditions, and the reaction permitted to proceed. Upon completion of the reaction, the reaction mixture is allowed to cool, and under certain conditions the NDMA may be separated from the aqueous ingredients. It has been suggested that by dissolving a small amount of sodium hydroxide or other alkali in the reaction medium, the reaction mixture will separate into two layers, the upper of which contains substantially all of the NDMA. If this layer is separated from the lower, or aqueous layer, it can be introduced directly into the chemical reduction step to provide UDMH without further treatment. However, it has been found that the NDMA layer is not of sufficient purity for efficient hydrogenation in the presence of a catalyst.

As indicated hereinbefore, it is desirable in large scale operations to reduce NDMA to UDMH by catalytic hydrogenation. Accordingly, it is a serious disadvantage that the NDMA produced by simple separation of an alkaline aqueous solution is not susceptible to efficient hydrogenation in a catalytic system. The reasons for this inability of the prior art NDMA solutions to be hydrogenated are not clearly understood. It is well known, however, that catalysts used in the hydrogenation reaction may be rendered inactive by trace amounts of catalyst poisons. It is possible that the presence of impurities such as inorganic salts carried over from the initial reaction step interfere with hydrogenation. With this possibility in mind, attempts have been made to distill directly the NDMA aqueous solution resulting from the nitrosation, and thereby to purify it. It has been found that distillation of the NDMA reaction product has not overcome the problems encountered in catalytic hydrogenation, however, and that the distillate cannot be efficiently hydrogenated catalytically. Furthermore, this distillation results in a constant boiling azeotrope of the NDMA in water, which boils at a concentration of about 28% of the former, and thereby provides an uneconomically dilute solution of the NDMA.

It is a feature of the present invention to provide a method of purifying aqueous solutions of NDMA to make them susceptible to efficient catalytic hydrogenation in the production of UDMH.

It is a further object of this invention to provide such a method which has the added advantage of concentrating the NDMA to a point at which the reduction operation is efficient, and provides economical conversion to UDMH.

It has now been discovered, quite unexpectedly, that if an aqueous solution of NDMA is treated first by the addition of a sufficient amount of caustic to provide a caustic concentration of about 3 to 40 weight percent in the solution, and thereafter is distilled until the overhead contains no more than about 10% of dimethylamine, collection thereafter of distillate rich in NDMA provides an aqueous NDMA solution which can be hydrogenated readily in the presence of a catalyst such as platinum or palladium supported on an inert carrier such as alumina, carbon black, and the like.

Furthermore, the distillation can be continued until the overhead contains about 10% of NDMA, and an aqueous solution of NDMA having a substantially higher concentration of NDMA than the 28% NDMA solutions provided by distillation in the absence of caustic, will be produced, with little loss of NDMA. The solutions produced will range as high as 70% in NDMA, depending on the amount of caustic present in the solution being distilled.

In the preferred embodiment of the present invention, the NDMA solution resulting from nitrosation is first separated into an aqueous layer and an oil layer containing most of the NDMA, and this oil layer is then treated by the herein process. The aqueous layer may be treated for removal of residual NDMA, and for ready disposal, by maintaining it above the temperature at which salts such as sodium sulfate decahydrate solidify, and distilling out the NDMA. The solution of salts is maintained in a liquid state by providing the proper amount of water to maintain such salts in solution after NDMA is removed. This preferred separation of the aqueous layer, prior to distillation, provides for economical operation, by reducing the volume of solution which must be heated on distillation to provide NDMA.

The two-fold advantage of the present process makes the over-all production of UDMH much more economical than it has been heretofore. The ability of the NDMA distillate from the herein process to be catalytically hydrogenated greatly lowers the cost of reduction to UDMH, and also the high concentration of these solutions relative to the concentration of NDMA solutions produced heretofore renders the operation much more efficient, making it possible to obtain much higher yields of UDMH product in a given reactor volume.

Figure 2:
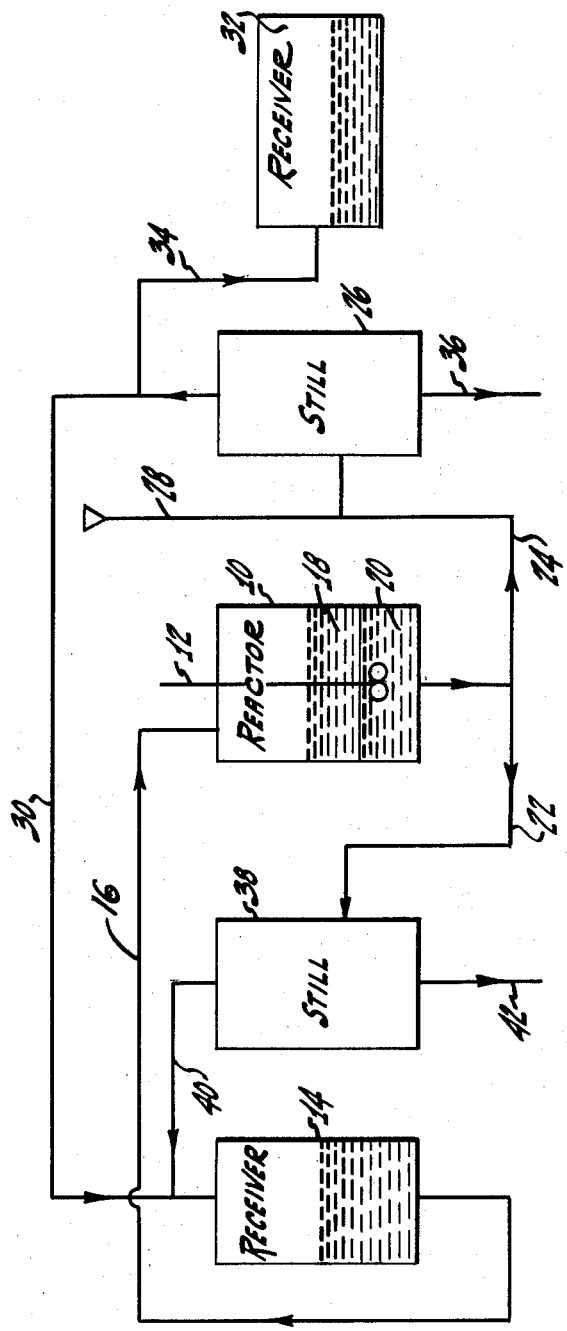

The invention will now be described more fully with reference to the drawing in which FIGURE 1 is a graph of the vapor compositions in NDMA versus the caustic concentration in the solution, and FIGURE 2 represents a diagram of the operation of the present process.

FIGURE 1 represents a graph of the weight percent of NDMA present in the overhead vapor plotted against the caustic concentration of the solution from which the NDMA vapors are obtained, in a case in which the caustic used is sodium hydroxide. Line AB relates the percentage of NDMA obtained in the vapor when caustic is added to the reaction mixture resulting from the nitrosation reaction, and containing about 25% NDMA, and the entire mixture is distilled. Line AC relates the percentage of NDMA obtained in the vapor, in a case in which the nitrosation reaction mixture was allowed to separate into layers and the oil layer, containing about 50% of the NDMA, was removed, treated with caustic, and subsequently distilled. It will be seen that an NDMA solution containing about 70% of this chemical may be obtained by distillation from a caustic-containing solution of the proper concentration, whereas an NDMA solution containing only about 28% of the NDMA distills from a solution containing no caustic, regardless of whether or not the oil layer is removed. In the preferred embodiment of this invention the oil layer is removed, thereby decreasing the amount of caustic required to obtain a 70% NDMA composition in the overhead vapors from 40% to 12%. The present process, however, is not limited to the case in which the oil layer is removed, for it may be seen that a substantial improvement in the concentration of NDMA obtained in the overhead vapor results when caustic is added to the reaction mixture and the entire mixture is distilled without separation of the layers.

In operation of the herein process, it is preferred to employ an NDMA solution prepared by reaction of dimethylamine with sodium nitrite and acid, or with nitrogen oxides. This solution is treated by addition of caustic to provide a solution containing 3 to 40% of caustic. The caustic employed may be sodium hydroxide or potassium hydroxide. The solution is then distilled until the overhead condensates stream contains less than about 10% of dimethylamine, and this initial distillate is removed from the system. The distillate which comes over next is then collected, preferably until the overhead NDMA concentration is about 10%, and thereafter distillation is stopped and the liquid remaining in the still is discarded. This results in the provision of a pure aqueous NDMA solution, which may be directly reduced by catalytic hydrogenation to provide UDMH. It has a high NDMA concentration, containing as much as about 70% of this chemical, and therefore is particularly suited to further treatments.

In accordance with the herein preferred mode of operation, the aqueous NDMA solution produced by the reaction of dimethylamine, sodium nitrite and acid, or by reaction of the dimethylamine with nitrogen oxides, is neutralized with caustic in a separate step. This operation requires less than about 3% of caustic in the solution, and causes the impurities in the solution, for example, sodium sulfate in the event the mineral acid sulfuric is employed in the production of NDMA, or sodium nitrate in the case of the nitrogen oxide vapor phase reaction, to be separated as an aqueous layer from the solution before distillation. This aqueous layer contains very little NDMA, and may be withdrawn from the mixture. The upper, or oil, phase contains the bulk of the NDMA, and this solution is the one which is distilled in accordance with the present process. It is treated herein by the addition of about 3 to 40% of caustic, and may be distilled directly.

The operation of the process in its preferred embodiment will now be described more particularly with reference to FIGURE 2. Preparation of the NDMA to be purified is carried out in reactor 10, equipped with stirrer 12. Dimethylamine, which may consist of commercial aqueous solutions of dimethylamine and aqueous distillate material containing small amounts of dimethylamine supplied from receiver 14, via line 16, is fed to reactor 10. After all of the dimethylamine is added, the reactor is charged with a mineral acid, such as sulfuric or hydrochloric acid. The acid is added slowly in an amount sufficient to convert part of the dimethylamine to the amine salt. Care should be taken that the final pH is above 5, and preferably at least 6. After the addition of the acid is complete, solid sodium nitrite is added at a rate which is governed by dissolution of the crystals.

The addition of sodium nitrite results in a lowering of the temperature within the reactor. During this addition, the temperature is maintained above 33° C., the freezing point of sodium sulfate decahydrate. When all of the sodium nitrite has been dissolved, sufficient additional acid is added to lower the pH of the medium to below about 5, thereby initiating the reaction between the dimethylamine and the sodium nitrite. During the course of the reaction, the temperature will rise to about 80° C. When the reaction is complete, the reaction medium is cooled to between 35° and 50° C. and a caustic solution is added with stirring in sufficient quantity to neutralize the excess acid. The stirrer is then turned off, and the product mixture is allowed to stand until it separates into an upper oil layer, 18, and a lower aqueous layer 20. The aqueous layer 20 is then removed through line 22, and it and the oil layer are processed further as described below.

Caustic is added to the oil, or NDMA, layer remaining in reactor 10, to provide a caustic concentration therein of about 3 to 40%, and the mixture is passed via line 24 to still 26. NDMA from other sources, such as recycle material from the hydrogenation of the NDMA, may also be added to still 26. The contents of still 26 are then refluxed for a period of time sufficient to vent the fixed gases in the system, such as nitric oxide and nitrogen. The initial overhead condensate, which is rich in unreacted dimethylamine, is passed to receiver 14 through line 30. When the dimethylamine concentration drops below about 10%, the overhead condensate stream is passed to receiver 32 via line 34. During the distillation, most of the NDMA comes over at a concentration of about 70%, with the NDMA concentration decreasing as lesser amounts of NDMA remain in the still. When the overhead concentration of this chemical drops to about 10%, distillation preferably is stopped and the liquid remaining in still 26 is drained through line 36.

The aqueous layer 20 contains up to about 3 to 4% of NDMA, and other materials such as a salt, depending upon the reactants used in the nitrosation. For example, in the event sodium nitrite and sulfuric acid are used, sodium sulfate decahydrate will form as a salt. The aqueous layer 20 is passed through line 22 to a second still 38, where it is distilled for removal of the NDMA, which is returned to the cycle at receiver 14, through line 40. The residue in still 38 is maintained liquid, for example by addition of water if necessary, and discarded through line 42.

The following examples are included by way of illustration of the present invention and are not to be deemed limitative thereof.

EXAMPLE 1

*Present Method of Purifying NDMA*

As an example of this process, 28 gallons of recycle distillate containing 12% NDMA from rereiver tank 14 was passed into reactor 10, via line 16. Thirty-five gallons of 40% aqueous dimethylamine solution was concurrently passed into the reactor and 10 gallons of 60° Bé. sulfuric acid was slowly added with stirring. One hundred and sixty pounds of sodium nitrite was then slowly added, followed by addition of 0.1 gallon of 60° Bé. sulfuric acid to reduce the pH below 5.0, thereby initiating the reaction. The reaction temperature rose rapidly to 80° C.

When the reaction was complete, the reactor was cooled to 40° C. and the medium was brought to an alkaline condition by the addition of 1 gallon of 30% aqueous caustic solution, and the batch was allowed to stand. An oily top layer and a lower aqueous layer formed, and the lower aqueous layer, containing sodium sulfate crystals and 3.5% by weight NDMA, was removed from the system into still 38, where the NDMA was distilled and recovered, and the residue discarded as an aqueous solution.

Sufficient 30% aqueous caustic solution was added to the organic layer remaining in reactor 10, to give a caustic concentration of 12%, and the contents of the reactor were passed to still 26. The batch was then distilled, and a forerun, containing primarily dimethylamine, was then taken off and sent to receiver 14 through line 30. When the forerun dimethylamine concentration dropped to 10%, the overhead stream was sent to NDMA receiver 32. The distillation was continued until the overhead condensate dropped to 10% NDMA. One hundred and forty-three pounds of NDMA was obtained as an approximately 55% aqueous solution.

The effectiveness of the NDMA distillate produced by the process of the present invention in the preparation of UDMH is demonstrated in the following example.

EXAMPLE 2

*Catalytic Hydrogenation, Present NDMA Solution*

One hundred grams of the NDMA aqueous solution produced by the method of Example 1 was hydrogenated in a Parr hydrogenation apparatus using an alumina-supported palladium catalyst. The hydrogenation was conducted at 50 p.s.i.g. and 45° C. for a period of 90 minutes. The catalyst was removed by filtration and the UDMH product was recovered by distillation through an efficient fractionating column. 40.6 grams of UDMH was obtained, corresponding to a 94% yield.

EXAMPLE 3

*Catalytic Hydrogenation, NDMA Not Purified by Present Method*

By way of comparison with the above examples, NDMA reaction mixture of the same kind as produced in Example 1 was distilled directly without addition of caustic, and without separation of the dimethylamine fraction, to yield an aqueous NDMA solution containing 28% of that material. When this NDMA solution was hydrogenated by the method of Example 2, only about a 10% yield of UDMH was obtained, as compared with the about 94% yield obtained in Example 2.

It will be seen from the above examples, that distillation of NDMA solutions in the presence of caustic and with separation of dimethylamine provides a product having both a high concentration of NDMA, and a purity, which make it uniquely suited to catalytic hydrogenation. The NDMA product of Example 1 has been shown in Example 2 to be readily susceptible to catalytic hydrogenation. The NDMA distillation product of Example 3, on the other hand, which was distilled in the absence of caustic and without separation of dimethylamine, is shown to have both a low concentration, and thereby theoretically even at best to provide a low amount of product per unit volume of reactor, and importantly to be ineffective in catalytic hydrogenation.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. A process of producing an aqueous nitrosodimethylamine solution of high purity, comprising adding to an aqueous solution of nitrosodimethylamine produced by nitrosation of dimethylamine and containing dimethylamine, sufficient caustic to provide a concentration of caustic in said solution of about 3 to 40%, and distilling the resulting solution first to remove dimethylamine until the overhead comprises not more than about 10% by weight of dimethylamine, and thereafter distilling the residue from said first distillation to produce a distillate rich in nitrosodimethylamine, and collecting said distillate rich in nitrosodimethylamine.

2. The process of claim 1 in which said distillate rich in nitrosodimethylamine is collected until the overhead comprises not less than about 10% by weight of nitrosodimethylamine.

3. A process of producing an aqueous nitrosodimethylamine solution of high purity, comprising adding to an aqueous solution of nitrosodimethylamine produced by nitrosation of dimethylamine and containing dimethylamine, sufficient caustic to make said aqueous solution alkaline and to facilitate its separation into an oil layer and an aqueous layer, separating said aqueous layer and said oil layer, adding to said oil layer sufficient caustic to provide therein about 3 to 40% of caustic, and distilling the resulting solution first to remove dimethylamine until the overhead comprises not more than about 10% by weight of dimethylamine, and thereafter distilling the residue from said first distillation to produce a distillate rich in nitrosodimethylamine, and collecting said distillate rich in nitrosodimethylamine.

4. The process of claim 3 in which said distillate rich in nitrosodimethylamine is collected until the overhead comprises not less than about 10% by weight of nitrosodimethylamine.

References Cited in the file of this patent

UNITED STATES PATENTS 2,802,031  Horvitz ---------------- July 19, 1954